United States Patent
Sato et al.

(10) Patent No.: US 7,878,529 B2
(45) Date of Patent: Feb. 1, 2011

(54) OCCUPANT PROTECTION DEVICE

(75) Inventors: Yuji Sato, Aichi-ken (JP); Toshinori Tanase, Aichi-ken (JP); Tomonori Miyatake, Toyota (JP); Kenichi Asano, Nisshin (JP); Naomi Fukushima, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 155 days.

(21) Appl. No.: 12/225,536

(22) PCT Filed: Nov. 29, 2006

(86) PCT No.: PCT/JP2006/323842

§ 371 (c)(1),
(2), (4) Date: Sep. 24, 2009

(87) PCT Pub. No.: WO2007/063914

PCT Pub. Date: Jun. 7, 2007

(65) Prior Publication Data

US 2009/0108571 A1    Apr. 30, 2009

(30) Foreign Application Priority Data

Dec. 1, 2005   (JP)   ............ 2005-348325

(51) Int. Cl.
*B60R 21/207* (2006.01)
*B60R 21/233* (2006.01)

(52) U.S. Cl. .................. 280/729; 280/730.2

(58) Field of Classification Search ............ 280/729, 280/730.2

See application file for complete search history.

(56) References Cited

U.S. PATENT DOCUMENTS 6,189,918 B1   2/2001   Stavermann
2003/0094796 A1*   5/2003   Feldman et al. .......... 280/730.2

(Continued)

FOREIGN PATENT DOCUMENTS

JP   6-1026   1/1994

(Continued)

OTHER PUBLICATIONS

Supplementary European Search Report dated Apr. 16, 2009.

(Continued)

*Primary Examiner*—Ruth Ilan
(74) *Attorney, Agent, or Firm*—Finnegan, Henderson, Farabow, Garrett & Dunner, LLP

(57) ABSTRACT

An occupant protection device is applied to a vehicle including a front seat and a rear seat, and includes a first protection device and a second protection device. The first protection device includes a first gas generator and a first side airbag, which is inflated and deployed between an occupant seated in the front seat and a side portion of the vehicle by gas generated by the first gas generator. The second protection device includes a second gas generator and a second side airbag, which is inflated and deployed between an occupant seated in the rear seat and a side portion of the vehicle by gas generated by the second gas generator. The thickness of the inflated second side airbag in the vehicle width direction is set greater than the thickness of the inflated first side airbag in the vehicle width direction.

11 Claims, 2 Drawing Sheets

U.S. PATENT DOCUMENTS

| | | |
|---|---|---|
| 2004/0119270 A1 | 6/2004 | Gu et al. |
| 2004/0124615 A1* | 7/2004 | Tanase et al. ............ 280/730.2 |
| 2005/0116451 A1* | 6/2005 | Kino et al. ............... 280/730.2 |
| 2005/0173908 A1* | 8/2005 | Takedomi et al. ........ 280/743.2 |
| 2006/0022439 A1 | 2/2006 | Bayley et al. |

FOREIGN PATENT DOCUMENTS

| | | |
|---|---|---|
| JP | 08-040176 | 2/1996 |
| JP | 08-310334 | 11/1996 |
| JP | 11-091466 | 4/1999 |
| JP | 11-091486 | 4/1999 |
| JP | 2000-507183 | 6/2000 |
| JP | 2001-138856 | 5/2001 |
| JP | 2001-328503 | 11/2001 |
| JP | 2003-246254 | 9/2003 |
| JP | 2004-210257 | 7/2004 |
| JP | 2005-087650 | 4/2005 |
| JP | 2005-519799 | 7/2005 |
| WO | WO 03/013914 | 2/2003 |

OTHER PUBLICATIONS

International Search Report.
Written Opinion of the ISA.

* cited by examiner

OCCUPANT PROTECTION DEVICE

FIELD OF THE INVENTION

The present invention relates to an occupant protection device including an airbag, which is inflated and deployed between an occupant seated in a vehicle seat and a side portion of the vehicle by gas generated from a gas generator.

BACKGROUND ART OF THE INVENTION

When a side collision occurs in which a vehicle collides with a side door of another vehicle, the side door deforms into the passenger compartment, and by the deformed side door, an occupant might be displaced inward of the passenger compartment from a position close to the side door. Also, depending on the height of the bumper of the vehicle that has collided into the side door, the lower section of the side door might deform into the passenger compartment more than the upper section of the side door. In this case, the lower section of the side door often deforms toward the lumbar region of the occupant.

Protection devices for protecting an occupant from a side collision as described above have been proposed in, for example, Patent Documents 1 and 2. The protection devices disclosed in Patent Documents 1, 2 protect an occupant from a side collision by inflating and deploying an airbag between the occupant seated in the rear seat and the side door of the vehicle. The airbag of such protection devices is inflated and deployed between the upper body of the occupant and the side door when a side collision occurs. The airbag inflated between the upper body of the occupant and the side door is displaced into the passenger compartment from a position close to the side door, accompanying the deformation of the side door into the passenger compartment caused by the side collision. Thus, the seated occupant is also displaced into the passenger compartment from the position close to the side door.

In general, the behavior of a vehicle during a side collision is a combination of parallel displacement and rotation. In particular, in a rotation of a vehicle, the position with respect to the center of gravity of the vehicle differs between the front side door and the rear side door. Thus, behavior of the vehicle in regard to rotation of the vehicle after collision differs between a side collision to the front side door and a side collision to the rear side door. Therefore, to secure occupant protection performance at the rear seat that is of the same level as that at the front seat during a side collision, occupant protection performance different from that of the front seat is desirably provided.

Patent Document 1: Japanese Laid-Open Patent Publication No. 8-40176

Patent Document 2: Japanese Laid-Open Patent Publication No. 8-310334

DISCLOSURE OF THE INVENTION

Accordingly, it is an objective of the present invention to provide an occupant protection device that protects an occupant seated in a rear seat from a side collision in a suitable manner.

To achieve the above objective, one aspect of the present invention provides an occupant protection device applied to a vehicle including a front seat and a rear seat. The occupant protection device includes a first protection device and a second protection device. The first protection device includes a first gas generator and a first side airbag, which is inflated and deployed between an occupant seated in the front seat and a side portion of the vehicle by gas generated by the first gas generator. The second protection device includes a second gas generator and a second side airbag, which is inflated and deployed between an occupant seated in the rear seat and a side portion of the vehicle by gas generated by the second gas generator. The thickness of the inflated second side airbag in the vehicle width direction is set greater than the thickness of the inflated first side airbag in the vehicle width direction.

DETAILED DESCRIPTION OF THE PREFERRED EMBODIMENTS

One embodiment of the present invention will now be described with reference to FIGS. 1 and 2.

Figure 1:
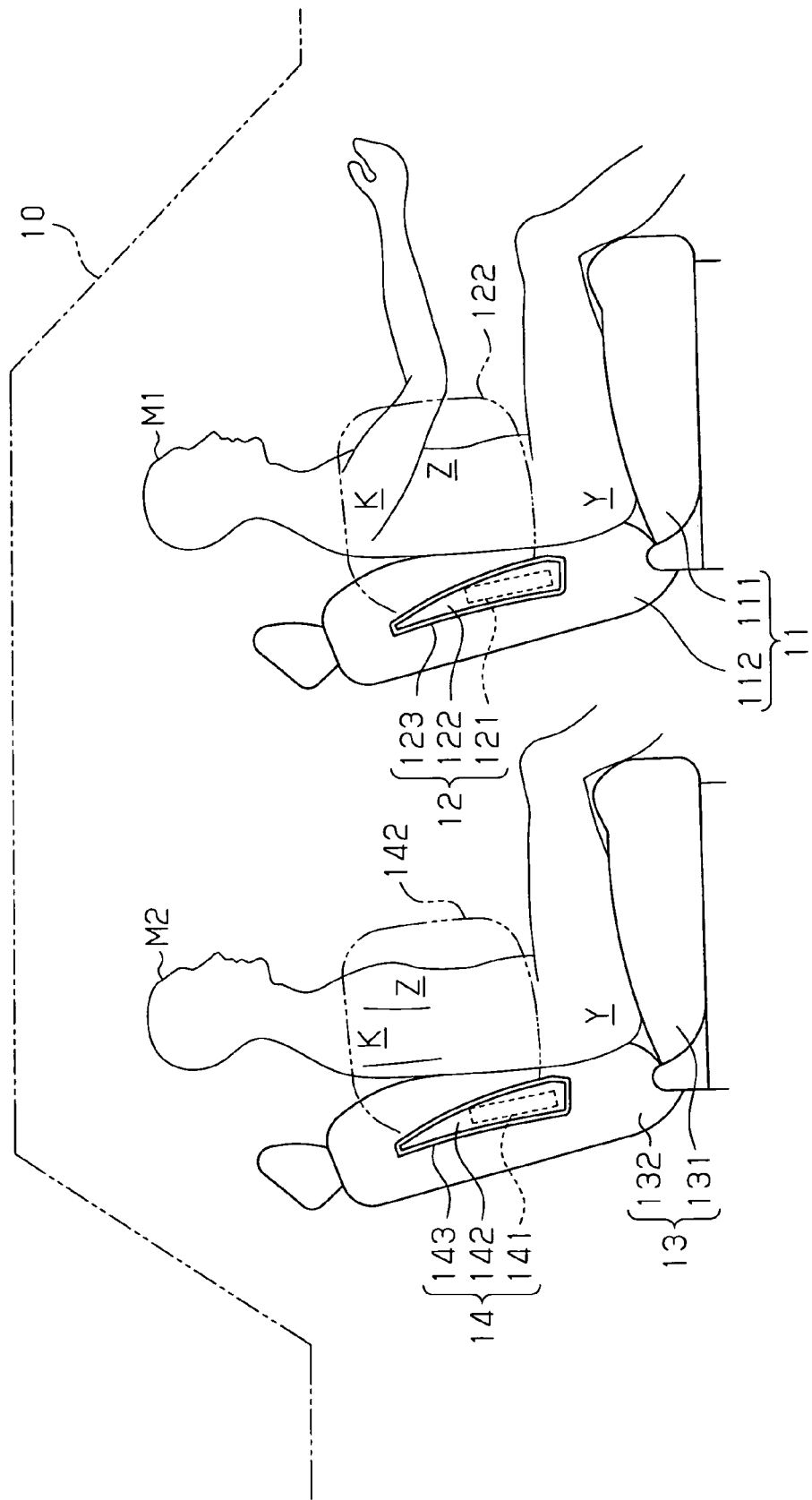
FIG. 1 is a side view of a vehicle provided with an occupant protection device according to one embodiment of the present invention.
Figure 2A:
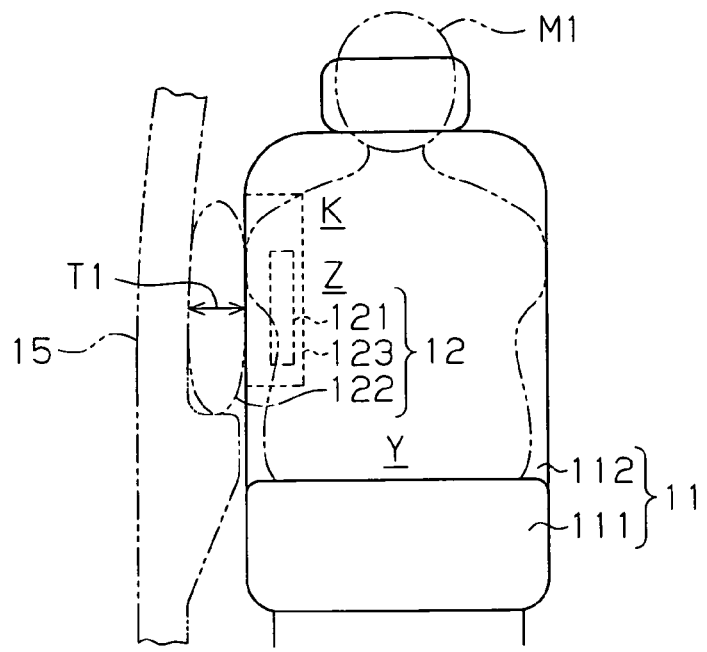
FIG. 2(a) is a front view of a first protection device provided at the front seat.
Figure 2B:
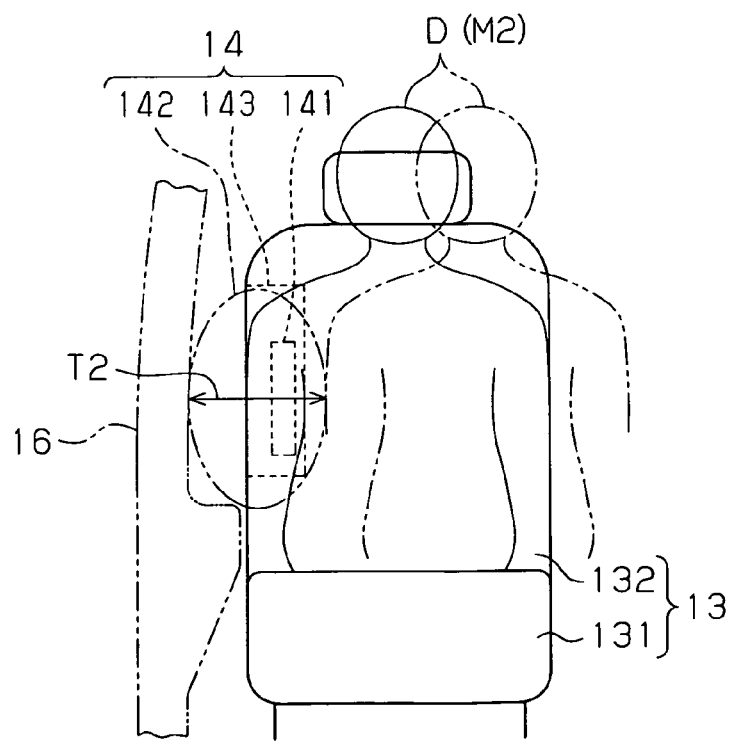
FIG. 2(b) is a front view of a second protection device provided at the rear seat.

As shown in FIG. 1, a vehicle 10 includes a front seat (driver's seat in the example of FIG. 1) 11 and a rear seat 13. The front seat 11 includes a seat portion 111 and a backrest 112, and the backrest 112 incorporates a first protection device 12. The first protection device 12 includes a first gas generator, which is an inflator 121 in this embodiment, an airbag 122, and a case 123, which accommodates the inflator 121 and the airbag 122. The case 123 is mounted on a frame (not shown) of the backrest 112. When a side collision sensor, which is not shown, detects a side collision on the vehicle 10, the inflator 121 is actuated, and pressurized gas is generated from the inflator 121 and fed to the airbag 122. The airbag 122 is inflated and deployed between the upper body of an occupant M1 seated in the front seat 11 and the side portion of the vehicle 10, which is a front side door 15 (see FIG. 2(a)) in this case, by the pressurized gas supplied from the inflator 121. The airbag 122 will hereafter be referred to as a first side airbag 122. In the example shown in the drawing, the first side airbag 122 is inflated in the range above a lumbar region Y of the occupant M1 and up to a shoulder region K of the occupant M1 as viewed from the width direction of the vehicle 10. That is, the first side airbag 122 is inflated between the region including the shoulder region K and a chest region Z of the occupant M1 and the front side door 15.

The rear seat 13 includes a seat portion 131 and a backrest 132, and the backrest 132 incorporates a second protection device 14. The second protection device 14 includes a second gas generator, which is an inflator 141 in this embodiment, an airbag 142, and a case 143, which accommodates the inflator 141 and the airbag 142. The case 143 is mounted on a frame (not shown) of the backrest 132. When a side collision sensor, which is not shown, detects a side collision, the inflator 141 is actuated, and pressurized gas is generated from the inflator 141 and fed to the airbag 142. The airbag 142 is inflated and deployed between the upper body of an occupant M2 seated in the rear seat 13 and the side portion of the vehicle 10, which is a rear side door 16 (see FIG. 2(b)) in this case, by the pressurized gas supplied from the inflator 141. The airbag 142 is referred to as a second side airbag 142. In the example of the drawing, the second side airbag 142 is inflated in the range above a lumbar region Y of the occupant M2 and up to a shoulder region K of the occupant M2 as viewed from the width direction of the vehicle 10. That is, the second side airbag 142 is inflated between the region including the shoulder region K and a chest region Z of the occupant M2 and the rear side door 16.

As shown in FIGS. 2(*a*) and 2(*b*), a thickness (thickness in the vehicle width direction) T2 of the inflated second side airbag 142 is set greater than a thickness (thickness in the vehicle width direction) T1 of the inflated first side airbag 122. The thickness T1 is defined as the thickness of a part of the inflated first side airbag 122 that is the greatest in the vehicle width direction. The thickness T2 is defined as the thickness of a part of the inflated second side airbag 142 that is the greatest in the vehicle width direction. Also, an internal pressure P2 of the inflated second side airbag 142 is set greater than an internal pressure P1 of the inflated first side airbag 122.

The thickness T1 of the first side airbag 122 is set in the range of, for example, 50 mm to 150 mm. The ratio T2/T1 is set in the range of, for example, 2.5 to 3.5, and the upper limit of the thickness T2 of the second side airbag 142 is 300 mm. The ratio P2/P1 is set in the range of 1.5 to 2.5.

In the preferred embodiment, the ratio T2/T1 of the thickness T2 of the inflated second side airbag 142 to the thickness T1 of the inflated first side airbag 122 is set to 3.07. Also, the ratio P2/P1 of the internal pressure P2 of the inflated second side airbag 142 to the internal pressure P1 of the inflated first side airbag 122 is set to 2.44.

The case where the thickness T2 of the second side airbag 142 is set equal to the thickness T1 of the first side airbag 122, and where the internal pressure P2 of the second side airbag 142 is set equal to the internal pressure P1 of the first side airbag 122 is referred to as a first condition. Also, the case where the thickness T2 of the second side airbag 142 is set to 3.07×T1, and where the internal pressure P2 of the second side airbag 142 is set to 2.44×P1 is referred to as a second condition. Then, experiments of a side collision to the rear side door 16 were conducted for each of the first condition and the second condition. The second side airbag 142 was inflated between the upper body (shoulder region and chest region) of an anthropometric dummy D and the rear side door 16.

The following results were obtained from the experiments of a side collision. That is, the spine load on the anthropometric dummy D measured in the side collision experiment using the second side airbag was smaller than the spine load on the anthropometric dummy D measured in the side collision experiment using the first side airbag. Also, in the side collision experiment conducted under the first condition, the anthropometric dummy D was tilted, so that the amount of displacement of the lumbar region Y of the anthropometric dummy D into the passenger compartment from the position close to the rear side door 16 is greater than that of the shoulder region K of the anthropometric dummy D. In the side collision experiment conducted under the second condition, the anthropometric dummy D was displaced into the passenger compartment from the position close to the rear side door 16, so that the amount of displacement of the lumbar region Y of the anthropometric dummy D into the passenger compartment from the position close to the rear side door 16 is not much different from that of the shoulder region K. That is, in the side collision experiment conducted under the second condition, the anthropometric dummy D was displaced in a substantially parallel motion into the passenger compartment from the position close to the rear side door 16 as shown by the chain line in FIG. 2(*b*).

As described above, the preferred embodiment has the following advantages.

(1) When a side collision occurs in which the occupant seated in the rear seat 13 is displaced into the passenger compartment from the position close to the rear side door 16, the occupant seated in the rear seat 13 is desirably displaced in a parallel motion as much as possible into the passenger compartment from the position close to the rear side door 16. When the occupant seated in the rear seat 13 is displaced into the passenger compartment from the position close to the rear side door 16 by the side collision, the greater the inclination of the upper body of the occupant, the greater the load on the spine of the occupant becomes.

As apparent from the above experimental results, the configuration in which the thickness T2 of the second side airbag 142 is greater than the thickness T1 of the inflated first side airbag 122 is effective in making the state where the occupant seated in the rear seat 13 is displaced into the passenger compartment from the position close to the rear side door 16 due to a side collision closer to the state of parallel displacement. That is, the configuration in which the thickness T1 of the inflated first side airbag 122 is greater than the thickness T2 of the inflated second side airbag 142 is effective in more reliably protecting the occupant from a side collision.

Furthermore, the configuration in which the internal pressure P2 of the second side airbag 142 is greater than the internal pressure P1 of the first side airbag 122 is effective in making the state where the occupant seated in the rear seat 13 is displaced into the passenger compartment from the position close to the rear side door 16 due to a side collision closer to the state of parallel displacement.

(2) The second side airbag 142 is inflated and deployed between the upper body (the shoulder region K and the chest region Z) of the occupant M2 above the lumbar region Y and the rear side door 16. That is, the lumbar region Y of the occupant M2 is not directly pressed by the second side airbag 142 inflated by the side collision.

In general, since the lumbar region Y of the occupant M2 is displaced into the passenger compartment by the side collision on the rear side door 16, if the second side airbag 142 presses the lumbar region Y of the occupant M2, the inclination of the upper body of the occupant M2 will be increased. The configuration in which the second side airbag 142 does not press the lumbar region Y of the occupant M2 is effective in reducing the difference between the displacement of the shoulder region K of the occupant M2 and the displacement of the lumbar region Y of the occupant M2.

The preferred embodiment may be modified as follows.

The second side airbag 142 may be inflated and deployed only between the shoulder region K of the occupant M2 and the rear side door 16. That is, the second side airbag 142 that is inflated upon occurrence of a side collision may press only the shoulder region K of the occupant M2.

The second side airbag 142 may be inflated and deployed only between the chest region Z of the occupant M2 and the rear side door 16. That is, the second side airbag 142 that is inflated upon occurrence of a side collision may press only the chest region Z of the occupant M2.

The invention claimed is:

1. An occupant protection device applied to a vehicle including a front seat and a rear seat, the device comprising:
   a first protection device including a first gas generator and a first side airbag, which is inflated and deployed between an occupant seated in the front seat and a side portion of the vehicle by gas generated by the first gas generator; and
   a second protection device including a second gas generator and a second side airbag, which is inflated and deployed between an occupant seated in the rear seat and a side portion of the vehicle by gas generated by the second gas generator, wherein the thickness of the inflated second side airbag in the vehicle width direction is set greater than the thickness of the inflated first side airbag in the vehicle width direction; and wherein the thickness of the inflated first side airbag is defined as the thickness of a portion of the inflated first side airbag that is the greatest in the vehicle width direction.

2. The occupant protection device according to claim 1, wherein the ratio of the thickness of the inflated second side airbag in the vehicle width direction to the thickness of the inflated first side airbag in the vehicle width direction is in the range of 2.5 to 3.5.

3. The occupant protection device according to claim 1, wherein the thickness of the inflated first side airbag in the width direction is set in the range of 50 mm to 150 mm, and wherein the upper limit of the thickness of the inflated second airbag in the vehicle width direction is 300 mm.

4. The occupant protection device according to claim 1, wherein the internal pressure of the inflated second side airbag is set greater than the internal pressure of the inflated first side airbag.

5. The occupant protection device according to claim 4, wherein the ratio of the internal pressure of the inflated second side airbag to the internal pressure of the inflated first side airbag is in the range of 1.5 to 2.5.

6. The occupant protection device according to claim 1, wherein the second side airbag is inflated and deployed between the upper body of the occupant above the lumbar region and the side portion of the vehicle.

7. The occupant protection device according to claim 6, wherein the second side airbag is inflated and deployed between at least the shoulder region of the occupant and the side portion of the vehicle.

8. The occupant protection device according to claim 6, wherein the second side airbag is inflated and deployed between a region including the shoulder region and the chest region of the occupant and the side portion of the vehicle.

9. The occupant protection device according to claim 1, wherein the thickness of the inflated second side airbag is defined as the thickness of a portion of the inflated second side airbag that is the greatest in the vehicle width direction.

10. The occupant protection device according to claim 1, wherein the first protection device is mounted to the front seat and the second protection device is mounted to the rear seat.

11. The occupant protection device according to claim 1, wherein the front seat is the front-most seat on a side of the vehicle and the rear seat is the second front-most seat on the same side of the vehicle.

* * * * *

UNITED STATES PATENT AND TRADEMARK OFFICE
CERTIFICATE OF CORRECTION

| | | |
|---|---|---|
| PATENT NO. | : 7,878,529 B2 | Page 1 of 1 |
| APPLICATION NO. | : 12/225536 | |
| DATED | : February 1, 2011 | |
| INVENTOR(S) | : Yuji Sato et al. | |

It is certified that error appears in the above-identified patent and that said Letters Patent is hereby corrected as shown below:

Title page, item 86 (§ 371(c)(1), (2), (4) Date), line 3, "September 24, 2009" should read --September 24, 2008--.

Signed and Sealed this
Fifth Day of July, 2011

David J. Kappos
*Director of the United States Patent and Trademark Office*